(12) United States Patent
Fong et al.

(10) Patent No.: US 11,822,522 B2
(45) Date of Patent: Nov. 21, 2023

(54) INTELLIGENT FILESYSTEM FOR CONTAINER IMAGES

(71) Applicant: EMC IP Holding Company LLC, Hopkinton, MA (US)

(72) Inventors: Victor Fong, Medford, MA (US); Kenneth Durazzo, San Jose, CA (US); Xuebin He, Westwood, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 155 days.

(21) Appl. No.: 16/778,896

(22) Filed: Jan. 31, 2020

(65) Prior Publication Data

US 2021/0240671 A1    Aug. 5, 2021

(51) Int. Cl.
| | |
|---|---|
| *G06F 16/182* | (2019.01) |
| *G06F 16/172* | (2019.01) |
| *H04L 29/08* | (2006.01) |
| *H04L 15/16* | (2006.01) |
| *G06F 15/16* | (2006.01) |
| *H04L 67/02* | (2022.01) |
| *H04L 69/04* | (2022.01) |
| *H04L 29/06* | (2006.01) |
| *H04L 67/06* | (2022.01) |
| *H04L 67/00* | (2022.01) |
| *H04L 67/568* | (2022.01) |

(52) U.S. Cl.
CPC .......... *G06F 16/183* (2019.01); *G06F 16/172* (2019.01); *H04L 67/06* (2013.01); *H04L 67/34* (2013.01); *H04L 67/568* (2022.05)

(58) Field of Classification Search
CPC ..... G06F 16/183; G06F 16/172; H04L 67/06; H04L 67/2842; H04L 67/34

USPC ......................................................... 707/827
See application file for complete search history.

(56) References Cited

U.S. PATENT DOCUMENTS

| | | | |
|---|---|---|---|
| 6,606,744 B1 * | 8/2003 | Mikurak | H04L 9/40 |
| | | | 717/174 |
| 7,009,967 B1 * | 3/2006 | Hariharasubrahmanian | ................ |
| | | | H04L 49/9094 |
| | | | 370/389 |
| 11,087,042 B1 * | 8/2021 | Hussey | G06F 8/63 |
| 11,128,692 B2 * | 9/2021 | Couleaud | H04L 67/06 |
| 2002/0049760 A1 | 4/2002 | Scott et al. | |

(Continued)

FOREIGN PATENT DOCUMENTS

| | | | | |
|---|---|---|---|---|
| CN | 110300120 B | * | 7/2021 | ......... H04L 63/0209 |
| CN | 109040252 B | * | 4/2022 | ............. H04L 67/06 |

(Continued)

*Primary Examiner* — David R Lazaro
*Assistant Examiner* — Berhanu Shitayewoldetadik
(74) *Attorney, Agent, or Firm* — Workman Nydegger

(57) ABSTRACT

One example method includes transmitting a request for a container image to a registry, receiving metadata associated with the container image, wherein the metadata allows a controller to mount an empty filesystem on a host machine, starting a container from the container image without receiving all files associated with the container image, receiving files, from a container server, needed by the container based on an access sequence associated with the container. This allows a container to be started without downloading the entire container image and also conversed bandwidth by providing the files as needed based on the manner in which the container accesses files during execution.

18 Claims, 5 Drawing Sheets

(56) References Cited

U.S. PATENT DOCUMENTS

| | | | | |
|---|---|---|---|---|
| 2005/0149528 | A1* | 7/2005 | Anderson | G06F 16/10 707/999.009 |
| 2006/0036570 | A1* | 2/2006 | Schaefer | G06F 9/44505 |
| 2006/0242685 | A1* | 10/2006 | Heard | H04W 12/35 726/3 |
| 2006/0248088 | A1* | 11/2006 | Kazar | H04L 67/5682 |
| 2007/0064702 | A1 | 3/2007 | Bates et al. | |
| 2007/0245409 | A1* | 10/2007 | Harris | H04L 67/06 726/5 |
| 2008/0005114 | A1 | 1/2008 | Li | |
| 2008/0005195 | A1 | 1/2008 | Li | |
| 2008/0005203 | A1* | 1/2008 | Bots | G06F 40/194 |
| 2008/0082551 | A1* | 4/2008 | Farber | G06F 16/164 707/E17.14 |
| 2008/0301140 | A1* | 12/2008 | Alpern | G06F 16/10 |
| 2009/0063393 | A1* | 3/2009 | Saake | G06F 16/113 |
| 2009/0271442 | A1* | 10/2009 | Young | G06F 16/16 |
| 2011/0016085 | A1* | 1/2011 | Kuo | G06F 16/184 707/615 |
| 2012/0084445 | A1* | 4/2012 | Brock | G06F 9/5077 709/226 |
| 2012/0218914 | A1* | 8/2012 | Tanaka | H04L 47/34 370/392 |
| 2012/0331021 | A1* | 12/2012 | Lord | G06F 16/174 707/826 |
| 2013/0047149 | A1 | 2/2013 | Xu et al. | |
| 2014/0040883 | A1 | 2/2014 | Tompkins | |
| 2014/0215154 | A1* | 7/2014 | Stewart | G06F 3/061 711/114 |
| 2014/0237184 | A1* | 8/2014 | Kazar | G06F 3/067 711/114 |
| 2014/0279846 | A1* | 9/2014 | Srinivasan | G06Q 10/107 707/608 |
| 2017/0052776 | A1* | 2/2017 | Kotian | G06F 21/12 |
| 2017/0061123 | A1* | 3/2017 | Parker-Wood | G06F 21/556 |
| 2017/0109372 | A1* | 4/2017 | Shimamoto | G06F 16/188 |
| 2017/0124345 | A1* | 5/2017 | Christiansen | G06F 16/13 |
| 2017/0177391 | A1* | 6/2017 | Wagner | G06F 9/4881 |
| 2017/0177860 | A1* | 6/2017 | Suarez | G06F 9/45558 |
| 2017/0177877 | A1* | 6/2017 | Suarez | G06F 16/2455 |
| 2017/0249141 | A1* | 8/2017 | Parees | G06F 11/3668 |
| 2018/0013750 | A1* | 1/2018 | Maurer | H04L 63/0815 |
| 2018/0039524 | A1* | 2/2018 | Dettori | G06F 9/4881 |
| 2018/0110012 | A1* | 4/2018 | Williams | G08C 17/02 |
| 2018/0137139 | A1* | 5/2018 | Bangalore | G06F 16/2379 |
| 2018/0137174 | A1* | 5/2018 | Cahana | G06F 9/455 |
| 2018/0183596 | A1 | 6/2018 | Deshpande et al. | |
| 2018/0189121 | A1* | 7/2018 | Jobi | G06F 9/455 |
| 2018/0189122 | A1* | 7/2018 | Jobi | G06F 9/455 |
| 2018/0239560 | A1 | 8/2018 | Venetsanopoulos et al. | |
| 2018/0293366 | A1* | 10/2018 | Subramaniyan | G06F 21/64 |
| 2019/0042143 | A1* | 2/2019 | Trika | G06F 11/323 |
| 2019/0095441 | A1* | 3/2019 | Scrivano | G06F 16/51 |
| 2019/0243681 | A1* | 8/2019 | Chen | G06F 9/4843 |
| 2019/0347517 | A1* | 11/2019 | Waugh | G06F 18/23 |
| 2019/0392050 | A1* | 12/2019 | Weil | G06F 16/176 |
| 2020/0250363 | A1* | 8/2020 | Partridge | G06F 30/20 |
| 2020/0409723 | A1* | 12/2020 | Starks | G06F 16/1748 |
| 2020/0409736 | A1* | 12/2020 | Starks | G06F 9/44589 |
| 2020/0409921 | A1* | 12/2020 | Starks | G06F 9/54 |
| 2021/0234836 | A1* | 7/2021 | Li | H04L 63/0281 |

FOREIGN PATENT DOCUMENTS

| | | | | |
|---|---|---|---|---|
| WO | WO-2009043037 | A2 * | 4/2009 | G06F 8/65 |
| WO | WO-2012048014 | A2 * | 4/2012 | G06F 11/16 |
| WO | WO-2015187716 | A1 * | 12/2015 | G06F 21/57 |

* cited by examiner

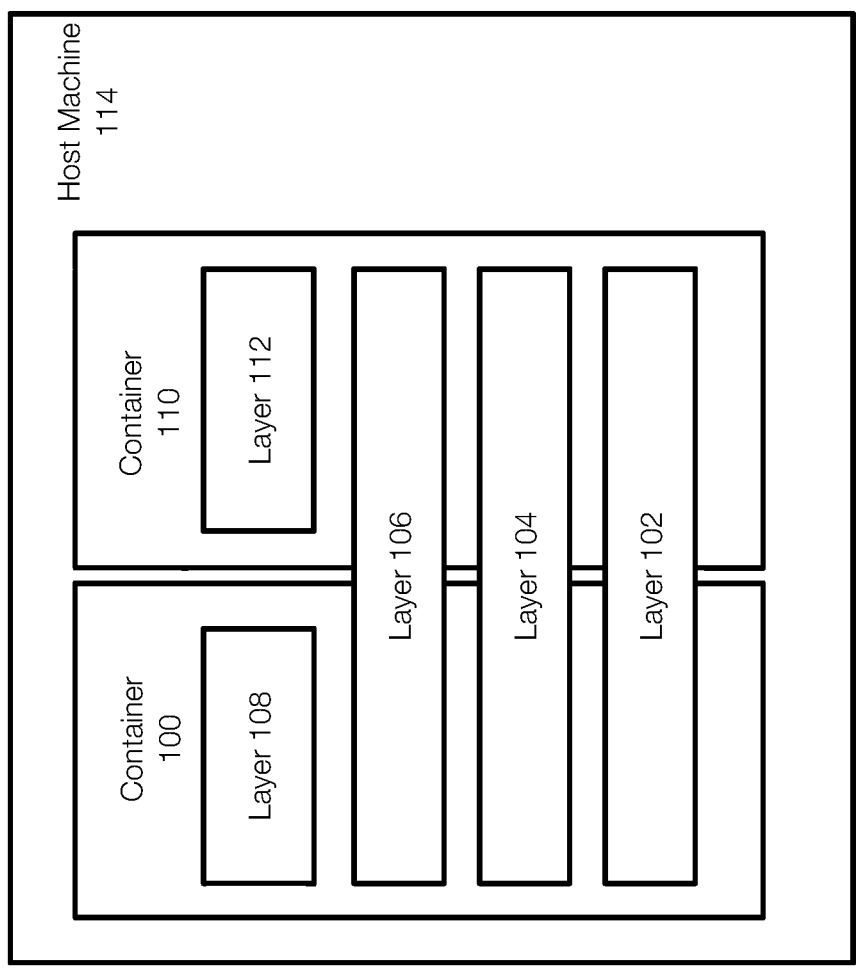

INTELLIGENT FILESYSTEM FOR CONTAINER IMAGES

FIELD OF THE INVENTION

Embodiments of the present invention generally relate to containers, and container related operations. More particularly, at least some embodiments of the invention relate to systems, hardware, software, computer-readable media, and methods for containers, container repositories, container management, container storage, container file systems, and/or container execution.

BACKGROUND

In the context of computers and computer software, a container is essentially a self-contained application. A running container typically includes all components, libraries, and dependencies that are needed to execute an application. Being self-contained, the same container can be run in different computing environments. In effect, a container isolates an application from the computing environment and this isolation allows an application to be run efficiently in different computing environments. Docker is an example of a container solution and Kubernetes is an example of a container orchestration solution. Example descriptions of containers and of container orchestration solutions can be found at www.docker.com and www.kubernetes.io (the documentation provided therein are incorporated by reference in their entirety).

Container images can be large (e.g., on the order of gigabytes). The size of container images sometimes causes problems. For example, because of the manner in which container images operate, the container images must be completely downloaded to the host machine before the container orchestration system can execute or start the container. As a result, users may experience a delay while waiting for the container image to be downloaded to the host machine.

In addition, a container image may include unnecessary files (e.g., files that are never used during execution of the container). When unnecessary files are included in a container image, the download time is longer and more storage and network resources are needed to store, start, and run containers. As previously stated, a container typically includes all required dependencies such that a process can run on many platforms. However, not all of these dependencies are used during the container's lifetime. In other words, a container image may include dependencies that may never be used. Further, while building the container image, artifacts related to compiling and installing operations may be generated. These artifacts are not used during execution and may contribute to the unnecessary consumption of computing resources.

One potential solution to this problem is to construct container images using layers. Layers can be shared between different container images and between running containers such that the total size of all images on the host machine is smaller than if all of the container images were stored separately. Unfortunately, different layers may maintain copies of the same file. In a container, only the files in the top layer are typically consumed. Even though the layers are shared, any duplication in the lower layers consumes storage space and transmission bandwidth. Plus, as previously stated, all layers of the image must be downloaded before the container can be started—even if some of the layers or portions thereof not used.

As a result, the ability to efficiently use containers and effectively manage computing resources is negatively impacted. Users may also experience adverse or inconvenient effects. Containers are burdened by the requirement to download all layers of an image before starting the image as previously stated. This may delay the start of the container may impact users.

The large size of a container image also results in a longer preparation time. For example, container layers may be compressed prior to transmission. However, decompressing layers or portions thereof that are not used takes time and contributes to the preparation time. The larger size of a container image can impact storage requirements, particularly when a node is running hundreds or thousands of containers. Finally, the large size of containers can impact bandwidth—particularly when bandwidth is an important resource, such as in a datacenter.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 1 discloses an example of a container architecture;

DETAILED DESCRIPTION OF SOME EXAMPLE EMBODIMENTS

Figure 2A:
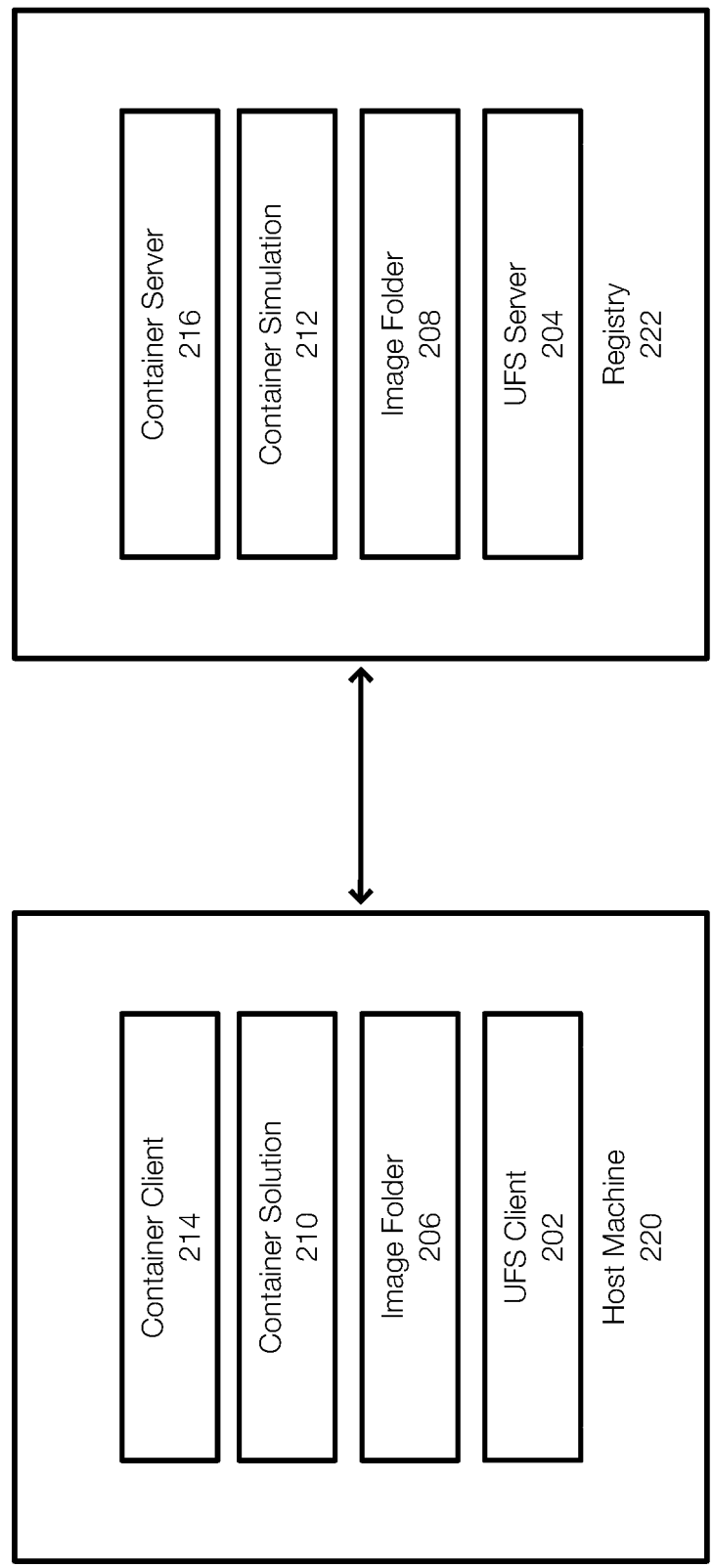
FIG. 2A illustrates an example of a container repository and illustrates systems and methods for performing container related operations.

Embodiments of the present invention generally relate to containers and container management. More particularly, at least some embodiments of the invention relate to systems, hardware, software, computer-readable media, and methods for storing container images, transmitting container images, and starting containers. Embodiments of the invention conserve computing resources including storage, bandwidth, and network resources required for containers.

Embodiments of the invention can reduce preparation time and start containers faster and more efficiently. Embodiments of the invention, for example, transmit a container image in a manner that allows the container to be started without completely downloading the container image. In other words, a container can be started when the container image even when the container image is not completely loaded on the host machine. Files or container images can be downloaded as needed or in accordance with an access sequence in which the files or layers associated with the container image are expected to be needed, accessed, or loaded.

A container image is basically a small version of an Operating System (OS). For example, a first container image may contain some of the same files as a second container image because they are using the same OS (by way of example only, Ubuntu or for other reasons. Consequently, some container solutions have introduced the concept of layers to deal with duplicate parts or layers of container images. For example, if two container images share the same dependency (e.g., a layer or portion thereof), then this layer can be used by both container images so that there is no need to download the layer again when running the second container. This will make the storage size of all container images on a host smaller than storing all of the container images separately. However, this may increase the size of individual containers when archiving reusable layers of this image and may lead to a lot of duplicate files in each layer of the same image.

Embodiments of the invention relate generally to a container filesystem that may include to a new and novel container repository and a new and novel mechanism to start a container that would eliminate the need to completely download all layers or files of a container image in order to run the container. The container filesystem may provide object bases filesystem operations and union filesystem operations and may provide a combination of fast-pushing and/or lazy-loading mechanisms.

FIG. 1 illustrates an example of a container architecture and/or of running containers in accordance with embodiments of the invention. By way of example only, a container image is essentially a blueprint of a container and a container is a runtime instance of a container image. A container image is typically constructed from a plurality of layers. By way of example and not limitation, when a container image is constructed, most of the layers except the last layer are typically read-only. The last layer is consumed.

FIG. 1 illustrates containers 100 and 110. In this example, each of the containers 100 and 110 are associated with the same layers 102, 104, and 106. This illustrates that the layers 102, 104, and 106 can be shared by multiple container images and by container runtime instances. The layer 108 is specific to the container 100 and the layer 112 is specific to the container 110. This allows each of the containers 100 and 110 to have their own data and data state even while sharing access to the same underlying layers. The layers 108 and 112 may be referred to as container layers or as writable layers. All changes made to the container 100 (e.g., writing, modifying, deleting files) are made to the layer 108. Similarly, all changes made to the container 110 are made to the layer 112. Advantageously, the containers 100 and 110 can be started without requiring that all of the layers or image be downloaded to the host machine 114.

In this example, the layers associated with the containers 100 and 110 are stacked. Examples of layers may include, but are not limited to, a kernel layer (which may be shared with all containers on a host), a boot filesystem (e.g., bootfs), base images such as binaries, libraries or other functionality not present in the kernel, a root filesystem (e.g., rootfs), other files or dependencies, and a container layer that is writable. Embodiments can be adapted to multiple container architectures with the benefit of the present disclosure.

A container image is typically associated with a start-up command (e.g., dockerfile in a Docker container solution). The start-up command may identify a base image, settings, and commands to execute as the container is started. In one example, the start-up command is a text documents that contains all the commands a user could call on the command line to assemble a container image and run an instance of a container. When a container orchestration system starts a container, the start-up command specified in the container image is executed to build and start the container.

More specifically, when building from a start-up command such as dockerfile, each command modifies the rootfs and generates an additional layer. Only new files or modified files are added to the new layer.

When the same command (or same start-up command) is executed to start the same container on different machines, the order of file access for the kernel to load files is largely the same across multiple executions. If the command and the root filesystem do not change, then the OS kernel will access the same set of files in the same order. Embodiments of the invention may determine this access sequence and use this access sequence to allow a container to start before the container image is fully downloaded. In effect, the files needed by the container, as identified in the access sequence, can be pushed or streamed to the host machine based on the access sequence. This allows for a faster container start up. Further, the access sequence may identify files that may not be needed or that may not be accessed. These files do not need to be downloaded, thereby conserving bandwidth and computing resources.

Embodiments of the invention, by way of example only, relate to a combined object-based filesystem and union filesystem. The client/server components of the novel container filesystem are referred to herein as a container client and a container server. The container client (which may be an example of a client controller) may be installed on each host machine that supports many-to-many connections with a server (e.g., the container server).

A union directory structure may be kept in both the client and the server. In addition, de-duplication may occur at both the client and the server. In one example, a union file system may implement a mount using layers. Example implementations of union file systems include Union FS and AUFS, which are incorporated by references.

The client may maintain a local cache that supports a mixture of intelligent push and lazy-loading mechanisms. For example, the client may keep a log of file access timings for each container and regularly update the server. This provides the server with a log of accesses made by the container in a real-world execution. Thus, the server keeps a master record of access logs from execution histories of running containers. This allows the container server to determine the order of files that are needed when the container is started. This also allows the container server to push the files as needed to the container client.

At container start-up, the container client may form an empty rootfs using information from metadata that is provided by the server. While the container is being created and starting (e.g., containerd and runc working), the container client obtains the start-up package for the specific container image from the container registry. Files are sent in order of usage based on the master record or based on the access sequence.

FIG. 2A illustrates an example of a system in which embodiments of the invention may be implemented. FIG. 2A illustrates a host machine 220 and a registry system 222. The registry system 222 is configured to cooperate with existing container filesystems, such as by way of example and not limitation Union File System. The union file system allows, for example, files and directories of separate file systems to be overlaid and viewed as a single file system.

In one example, embodiments of the invention may include a container client and a container server that cooperate with a file system. In the example of FIG. 2A, a filesystem (e.g., a union filesystem or UFS) may be built on a remote filesystem such as NFS or ObjectFS. Embodiments of the invention are configured to log access histories and generate logs that represent access sequences or the order in which files are accessed when starting a container.

Embodiments of the invention provide a container repository and a mechanism for starting a container that eliminate the need to download all layers of a container image in order to run the container. This may involve the use of a remote file system and a combination of mechanisms to push and load the layers or files.

Embodiments of the invention thus provide a remote file system that includes a filesystem, a remote file system server and a remote file system client.

In one example, the UFS server 204 records the time of each file access of each container and reports this information to the container server 216. When a file, that is yet not downloaded to the image folder 206 on the host machine from the image folder 208, is accessed, the UFS client 202 will download this file from the UFS server 204. This access will be logged and provided to the container server 216.

Both the UFS client 202 and the UFS server 204 have the ability to send file access records to the container server 216. As a result, the container server 216 can build a list of files that will be required in different stages of the execution of a container. Further, the container server 216 may also be able to determine timing information related to when these files are accessed.

The list of files that have been accessed during the execution of a container may grow or be augmented as more host machines run instances of a particular container and information related to the execution of the container is provided back to the container server 216 by different clients.

By maintaining the list of files (the access sequence of a container) and/or timing information of each file, the container server 216 will be able to ask the UFS server 204 to push files only before those files are needed by the UFS client 202 so that the container on the host machine 220 can continuously run.

Generally, the manner in which a new or updated container image is built and uploaded to the registry system 222 is not substantially impacted by embodiments of the invention. However, once a container image or all of the image's layers are uploaded to and extracted by the container server 216 and stored in the image folder 208 as part of the registry system 222, the container server 216 may run or perform a container simulation 212. The container simulation 212 may include examining the container image to identify which files are at the highest layer. For example, the simulation 212 may scan through all of the layers to identify files that are duplicated across layers and then identify the files at the highest levels or layers. This allows deduplication by sending the files only in the highest layers. Thus, these duplicate files are not transmitted for the lower layers.

The container simulation 212 may also execute the container by running a simulation. While executing the container in a simulation, the UFS server 204 may record the order in which files in the container's image folder or filesystem are accessed by the operating system.

This process allows the container server 216 to generate or record of a list of files that may be accessed by a process in a container (compared to duplicated files from lower levels that will not be accessed) and a set of files that are accessed at the start-up time and the sequence (and/or timing) in which the files are accessed. At this point, the container image on the registry server 222 is ready for consumption by host machines.

Figure 2B:
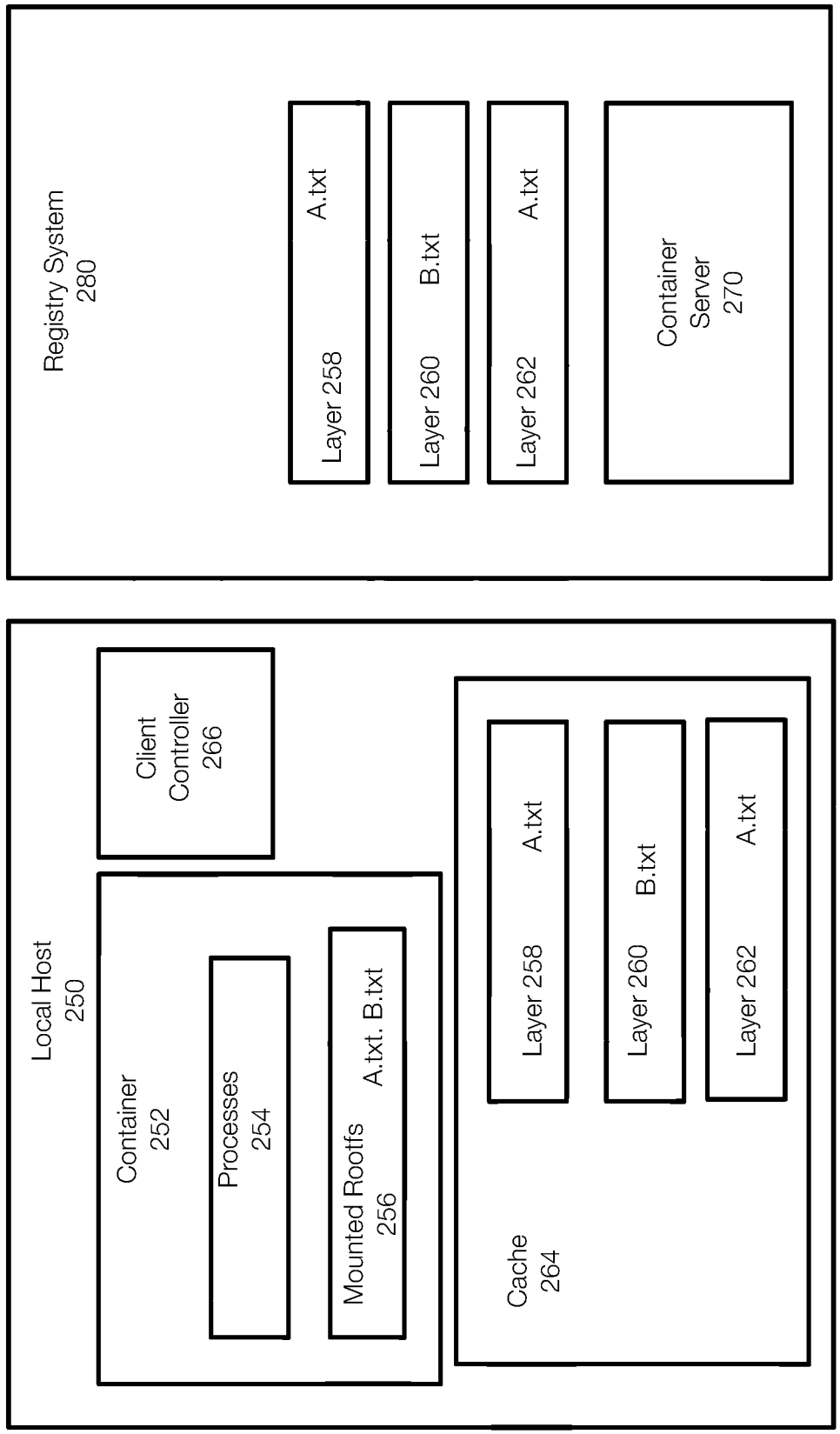
FIG. 2B illustrates another example of a container filesystem in operation.

FIG. 2B an example of a filesystem in operation. In FIG. 2B, a client controller (container client) 266 may be installed on the host 250. The controller 266 may be a daemon. When starting a container, the appropriate command is invoked along with a location of the container image. The cache 264 may be checked by the controller 266 to determine if metadata of the container image is already cached. If the image is not cached, the registry system 280 and, in particular the container server 270, is contacted to obtain the metadata for the container image. The controller 266 may mount an empty filesystem with the structure specified in the metadata.

At this point, the container 252 is ready to be started. The container server 270, in one example immediately begins sending over the startup package, which may include files that the container 252 may need at start up time. The controller 266 extracts the package and caches the files in the appropriate layer directory. For example, A.txt may be cached in layer 258. FIG. 2B illustrates that the layer 262 may also include the A.txt file. However, embodiments of the invention may not need to download the A.txt file at least because the same file is present in a higher layer (the layer 258). The layer 260 may include the file B.txt.

In one example, the files A.txt and B.txt are downloaded at least because they are part of an access sequence for the container 252. However, they may not be downloaded until after the container starts and may be downloaded in accordance with the access sequence associated with the container 252 or the image from which the container 252 is started.

When a layer is cached, but is not needed upon startup, the layer or associated files can be lazy loaded based on the access sequenced from the cache 264.

In one example, the controller 266 continues to log file accesses by the container 252 and provide the log to the server 270 periodically (e.g., every N minutes) or based on another schedule. When a file that has never been used before is requested, the file may be transferred according to, by way of example, an object based file system. However, the file may be cached in the appropriate layer. Thus, embodiments of the invention are able to fuse different types of file systems while allowing faster preparation and start times for containers.

In this example of FIG. 2B, the lower layers 260 and 262 may be deduplicated.

Figure 3:
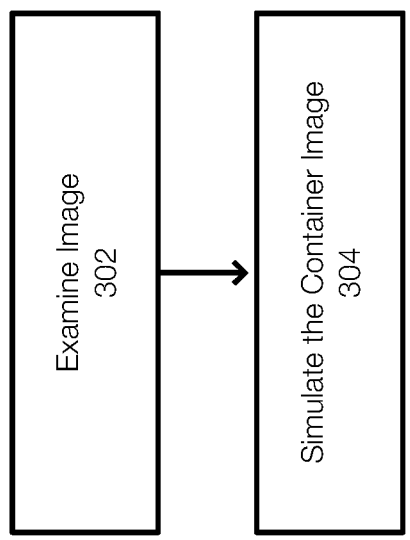
FIG. 3 illustrates an example of a container related operation including simulating a container execution to record or log file access times and sequence.

FIG. 3 illustrates an example of a method for initializing a container image. In FIG. 3, a container server (e.g., the container server 212) may begin a process of initialization. This process may begin by examining 302 a container image, which may already exist in the image repository or registry or which may have been uploaded to the repository, to identify highest layers at which duplicate files are located. In one example, examining 302 the container image may include scanning all of the layers to identify files that are duplicated and documenting the highest layers for those files.

This process aids in the transmission of the container image at least because duplicate files in the base or intermediary layers do not need to be transmitted when a container image is transmitted to a host machine. This conserves transmission bandwidth and may conserve storage as well. In one example, the files in each layer may be documented.

Next, the container may be simulated 304 or executed in a simulation environment. This allows the UFS server (or other filesystem server) to identify how the files in the container image are accessed (e.g., the order and/or the timing during startup and/or during normal execution). Thus, an access sequence is determined and stored for or associated with the container image. This information can be stored in a database or other structure and may be used when transmitting the container image to a host machine. The access sequence for a container allows the container to be started prior to fully downloading the container image. The files are transmitted in accordance with the access sequence determined during the simulation (or from actual execution on host machines). As a result, the files may arrive when actually required by the running container.

Returning to FIG. 2A, the container client 214 (or the controller 266) is an example of an executable that may be installed on each host machine 220. The container client 214 may also include a file system that may be registered to the kernel of each of the container host machines. When a request to start a container is made, the container client 214 determines if the container image is already cached on the host machine 220 (e.g., by examining the local file system or image folder 206). If present, the container orchestration system is ready to execute the container and may be directed to execute the container. When the container image is not cached, the container image transmission process begins.

The container image transmission process may begin when the container client 214 requests a container image from the container server 216. The container server 216 may reply with the metadata of all file and directory structures for the container image. The container client 214 then mounts the UFS to the host machine 220 using the metadata. Once the UFS is mounted, the container client 214 informs the container orchestration system that the container is ready to execute. At the same time, the container server 216, using the list or database of file accesses and timings (e.g. the access sequence), begins to push all of the necessary files, in the order the files were accessed (e.g., as reported by the UFS server 204, the UFS client 202 and/or based on the container simulation 212) to the container server 216.

In this example, the container is ready to start at least when the container client 214 mounts the UFS to the host machine 220 using the metadata. Thus, the container can be started without waiting for the entire container image to be downloaded. The files needed for container start-up are transferred to the host machine 220 in the based on the previously determined access sequence. Thus, transmission of the container image and the container start-up is a stream-like process.

After the initial transmission process, the container image may be cached on the host machine. Cached layers and transferred files can be shared across container images.

Figure 4:
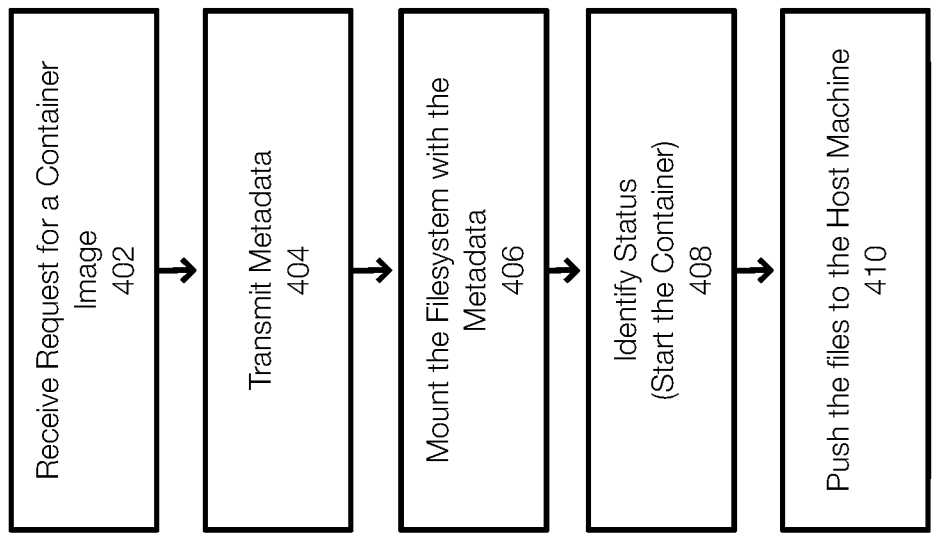
FIG. 4 illustrates an example of performing a container related operation including transmitting a container image.

FIG. 4 illustrates an example of transmitting a container image to a host machine and/or to starting a container on the host machine. In one example, a request for a container image is received 402 by the registry or by a container server. The request may be generated by a container client from the host machine. The container client may have checked to determine whether the requested container image was cached as the host machine.

In response to the request, the container server may transmit 404 metadata related to the file and directory structures of the container. Using the metadata, the container client mounts the file system (e.g., the UFS filesystem). Once the filesystem is mounted, the container client replies to the container orchestration system that the container can be started. At the same time, the container server pushes 410 (or begins pushing) files to the host machine or to the USF client in the order in which they were accessed. In other words, files are pushed based on the access sequence. As previously stated, this order is stored at the registry server based on a simulation of the container or based on actual execution performed on a host machine. The container can be started on the host machine before the entire image is downloaded as previously discussed.

Figure 5:
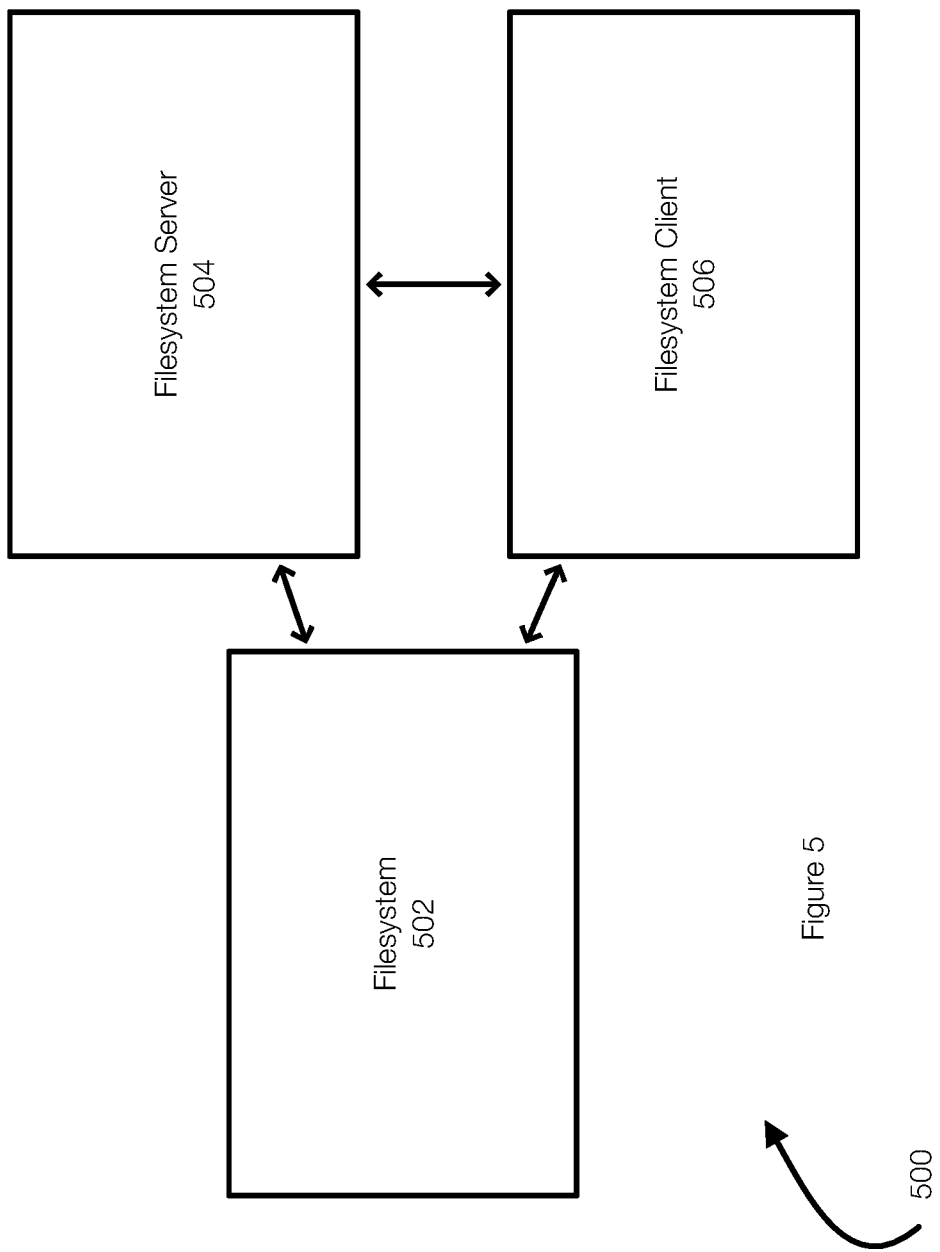
FIG. 5 illustrates an example of a container repository and filesystem.

FIG. 5 illustrates another example of an environment for implementing embodiments of the invention. FIG. 5 illustrates an example of a container filesystem 500 that includes a filesystem 502 (e.g., a union filesystem), a filesystem server 504 (a container server), and a filesystem client 506 (a container client or controller).

The filesystem 502 is configured to provide capabilities such as the ability to log or generate an access sequence. This history allows the server 504 and client 506 to cooperate when pushing files needed by a container running on a host. In this example, the server 504 may cooperate with the filesystem 502 to generate the access sequence. Both the client 506 and the server 504 have the ability to identify accesses by a container and ensure that these accesses are recorded. The server 504 may generate a list of files, which includes the order in which the files are accessed, for a container image. This allows the server 504 and the client 504 to know which files are needed and during what stage of container execution the files are needed. In effect, the files can be eagerly pushed prior to need.

The server 504 may also analyze and/or similar containers to identify where files are located (e.g., which layer), identify which files are duplicates, and identify access sequences.

The client 506 is installed on hosts and may include a filesystem that should be registered to the OS kernel of each of the container host machines. The client 506 is typically invoked when a request is made to start a container. These components thus cooperate to facilitate container management and execution, conserve computing resources, reduce container start and preparation times, and the like.

Thus, the server 504 server executes a simulated run for each of the container images when the images are uploaded. These simulations will record all the files accessed during the container start-up times, so that when a host machine wants to start a container from an image, only recorded files will be transmitted to the host machine.

Embodiments of the invention allow a host machine to start a container without downloading the whole container image. This will make it much faster when starting the container on the host machine for the first time.

Accesses performed during container lifecycle are also tracked. In one example, a pass-through filesystem that is used that can record file access (including unexpected file access) throughout the lifecycle of the container. The access log will be reported back to the server periodically and kept in the access sequence. The server 504 utilize the file access sequence or access log for future requests for this image. Because of those, a newer request to start a container from this image would only need to download files right before those files are needed.

This mechanism eliminates unnecessary network bandwidth and storage space for files that are never accessed in the history of container execution for each container image.

Embodiments of the invention further allow the transmission of a container image and starting a container image to be a stream-like process. Using a remote filesystem and an access sequence allows a server to push files that are necessary for a container to start. As soon as the directory is mounted remotely with metadata from server, the container is ready to be started. The user would no longer need to wait for the entire container image to be downloaded. The container can continue executing while the rest of the files are streaming.

Because embodiments of the invention bring the ability to download the files only before they are needed or when they are needed, the execution of a container will continuously make the client controller downloading new files from the container server when the files are needed or will be needed. If the execution of a container is stopped for certain reasons, files that are needed in the later execution of the container would not be downloaded.

The container image can also be flattened for metadata transfer. When files are duplicated across layers, the files on lower layers may never be accessed by the specific container. Thus, at the container image initialization stage, the server 504 examines files on each layer to determine which files are visible for a specific image. When the container image is being consumed by the client 506, metadata and content of the overwritten files would not be transmitted. By using the container filesystem disclosed herein, the user would no longer need to waste network bandwidth and storage space for files that would never be accessed by a container.

When a layer is shared across multiple container images and a file is visible to one image but not the others (upper layer on another image has overwritten a file), the file will be transmitted to the host following the same container image transmission mechanism described earlier.

The filesystem 500 may also be used to transmit the container image. Current container solutions are using HTTP/HTTPS protocols to transmit container images, because HTTP/HTTPS is already widely used and very flexible on resources management. However, in order to use HTTP/HTTPS, it must be very clear about what resources are going to be transmitted. Mounting a remote filesystem, such as NFS, to the container image folder will make it possible to download a file only when this file is access by the container runtime while executing this container. To the host machine, it appears that all the files present, but the content of each files would be downloaded if needed.

The following example illustrates embodiments of the invention. A datacenter belongs to a bank and is performing compute intensive jobs, such as a recommendation service that will analyze the user purchase history and make a list of offers for the user based on his/her current location or other information. The bank may want to adopt container technologies.

To facilitate this process, a compute node (e.g., a PowerEdge R940xa) may be configured as a host machine that is running compute intensive jobs. A storage node (e.g., PowerEdge R7425 with SC All-Flash connected) may be configured as an Image Registry Server or Container Registry storing all generated images by this bank. The host machines can have embodiments of the invention preinstalled on the node and configured.

The bank's DevOps team will be responsible for building a container image on their local machine, with the executable of a recommendation server, and all its required libraries and frameworks installed in the image, and then push the container image to registry server. Once registry server receives the image for the first time, the registry server or a container server will extract the image to an image folder that is formatted using UFS as the filesystem. Then the server will use a container technology to run the container.

While the container is running, the container will access files inside the image folder. Because this folder is using a filesystem that can record file accesses and report to container server. The container server will generate a list of files that were accessed during the container execution. This list may also identify the times at which the files were accessed. The list is an example of an access sequence.

Next, a data analyst wants to run the newest version of the image with the updated commendation algorithm with some generated user data. This data analyst only needs to fill the Kubernetes deployment template for this recommendation server provided by DevOps team with the user data location and use kubectl, Kubernetes' Command Line Interface, to deploy.

Because the image that will be used is the latest version, the Kubernetes' workers do not have the image yet. The client controller will be triggered to download the image from the registry. The client controller will get the metadata from the container server and use that information to mount a remote UFS image folder to a local folder that is created for this container image. After the folder is successfully mounted, the recorded required files for starting the container will be eager-pushed to the image folder on the client side or to the host machine. The host machine does not need to allocate extra space for files that would never be used.

Once the required files are transmitted over to the host machine, the container would be ready for start without waiting for the rest of the files. To the host machine, all the other files appear to be on the host machine, while the content of the files is not downloaded yet. With the container continuously running, when a file is accessed whose content is not downloaded yet, the client would then download the content from server and meanwhile would report to container server. This would provide the container server with extra file access information other than the initial simulation execution. This can be stored in the access sequence.

The image of recommendation server will surely be used by other data analysts or production deployment, and the container of this image will be started and running in this datacenter. When the execution of this container happens more, the information, maintained by container server, about the files accessed by the container will grow. This will make the later execution of this container even faster since lazy-loading would less happen.

In another example, a developer is working from home and would like to run a container on her laptop. With the current container solutions, it would take she few minutes to download the entire container image from her company's image repository and extract the image to the local file system.

If the laptop is configured with the client controller (e.g., client 506 or container client 214), the developer using Dell's laptop would have much better user experience since it would take less time to start the container and less space to store the container image when an image registry as discussed herein is also available.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, container operations and/or filesystem operations. More generally, the scope of the invention embraces any operating environment in which the disclosed concepts may be useful.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud storage environments in connection with which embodiments of the invention may be employed include, but are not limited to, Microsoft Azure, Amazon AWS, and Google Cloud. More generally however, the scope of the invention is not limited to employment of any particular type or implementation of cloud storage.

In addition to the storage environment, the operating environment may also include one or more clients that are capable of collecting, modifying, and creating, data. As such, a particular client may employ, or otherwise be associated with, one or more instances of each of one or more applications that perform such operations with respect to data.

Devices in the operating environment may take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

Following are some further example embodiments of the invention. These are presented only by way of example and are not intended to limit the scope of the invention in any way.

Embodiment 1. A method, comprising transmitting a request for a container image to a registry, receiving metadata associated with the container image, wherein the metadata allows a controller to mount an empty filesystem on a host machine, starting a container from the container image without receiving all files associated with the container image, and/or receiving files, from a container server, needed by the container based on an access sequence associated with the container.

Embodiment 2. The method of embodiment 1, further comprising determining the access sequence for the container based on a simulation of the container at the registry.

Embodiment 3. The method of embodiments 1, and/or 2, further comprising caching the container image at the host machine.

Embodiment 4. The method of embodiments 1, 2, and/or 3, further comprising logging file accesses by the container at the host machine, wherein file accesses are added to the access sequence.

Embodiment 5. The method of embodiments 1, 2, 3, and/or 4, further comprising tracking file accesses by the container through a container lifetime.

Embodiment 6. The method of embodiments 1, 2, 3, 4, and/or 5, further comprising executing the container without having all files associated with the container.

Embodiment 7. The method of embodiments 1, 2, 3, 4, 5, and/or 6, further comprising flattening the container image for transfer, wherein files not identified in the access sequence are not transmitted to the controller.

Embodiment 8. The method of embodiments 1, 2, 3, 4, 5, 6, and/or 7, further comprising mounting a remote filesystem to facilitate transmitting files for the container based on the access sequence.

Embodiment 9. The method of embodiments 1, 2, 3, 4, 5, 6, 7, and/or 8, further comprising determining whether the container image or any layers thereof are cached at the host machine.

Embodiment 10. The method of embodiments 1, 2, 3, 4, 5, 6, 7, 8, and/or 9, further comprising receiving a startup package that includes files for the container at startup.

Embodiment 11. A method for performing any of the operations, methods, or processes, or any portion of any of these, disclosed herein.

Embodiment 12. A non-transitory storage medium having stored therein instructions that are executable by one or more hardware processors to perform the operations of any one or more of embodiments 1 through 11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads.

While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Any one or more of the entities disclosed, or implied, by the Figures and/or elsewhere herein, may take the form of, or include, or be implemented on, or hosted by, a physical computing device. As well, where any of the aforementioned elements comprise or consist of a virtual machine (VM), that VM may constitute a virtualization of any combination of the physical components disclosed herein.

In one example, the physical computing device includes a memory which may include one, some, or all, of random access memory (RAM), non-volatile random access memory (NVRAM), read-only memory (ROM), and persistent memory, one or more hardware processors, non-transitory storage media, UI device, and data storage. One or more of the memory components of the physical computing device may take the form of solid state device (SSD) storage. As well, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    generating an access sequence by a container server cooperating with a file system, wherein the access sequence identifies files needed by a container;
    transmitting, by a local host, a request for a container image to a registry;
    receiving metadata associated with the container image, wherein the metadata allows a controller to mount an empty filesystem on the local host;
    starting the container from the container image without receiving all files associated with the container image;

receiving files, from the container server, needed by the container based on the access sequence associated with the container, wherein the files were deduplicated prior to being received by the local host;

running the container on the local host;

logging file accesses by the container at the local host;

transmitting the file accesses to the container server, wherein the file accesses are added to the access sequence by the container server.

2. The method of claim 1, further comprising determining the access sequence for the container based on a simulation of the container at the registry.

3. The method of claim 1, further comprising caching the container image at the local host.

4. The method of claim 1, further comprising tracking file accesses by the container through a container lifetime.

5. The method of claim 1, further comprising executing the container without having all files associated with the container.

6. The method of claim 1, further comprising flattening the container image for transfer, wherein files not identified in the access sequence are not transmitted to the controller.

7. The method of claim 1, further comprising mounting a remote filesystem to facilitate transmitting files for the container based on the access sequence.

8. The method of claim 1, further comprising determining whether the container image or any layers thereof are cached at the local host.

9. The method of claim 1, further comprising receiving a startup package that includes files for the container at startup.

10. A non-transitory storage medium having stored therein instructions that are executable by one or more hardware processors to perform operations comprising:

generating an access sequence by a container server cooperating with a file system, wherein the access sequence identifies files needed by a container;

transmitting, by a local host, a request for a container image to a registry;

receiving metadata associated with the container image, wherein the metadata allows a controller to mount an empty filesystem on the local host;

starting the container from the container image without receiving a II files associated with the container image;

receiving files, from the container server, needed by the container based on the access sequence associated with the container, wherein the files were deduplicated prior to being received by the local host;

running the container on the local host;

logging file accesses by the container at the local host;

transmitting the file accesses to the container server, wherein the file accesses are added to the access sequence by the container server.

11. The non-transitory storage medium of claim 10, the operations further comprising determining the access sequence for the container based on a simulation of the container at the registry.

12. The non-transitory storage medium of claim 10, the operations further comprising caching the container image at the local host.

13. The non-transitory storage medium of claim 10, the operations further comprising tracking file accesses by the container through a container lifetime.

14. The non-transitory storage medium of claim 10, the operations further comprising executing the container without having all files associated with the container.

15. The non-transitory storage medium of claim 10, the operations further comprising flattening the container image for transfer, wherein files not identified in the access sequence are not transmitted to the controller.

16. The non-transitory storage medium of claim 10, the operations further comprising mounting a remote filesystem to facilitate transmitting files for the container based on the access sequence.

17. The non-transitory storage medium of claim 10, the operations further comprising determining whether the container image or any layers thereof are cached at the local host.

18. The non-transitory storage medium of claim 10, the operations further comprising receiving a startup package that includes files for the container at startup.

\* \* \* \* \*